United States Patent Office 2,953,509
Patented Sept. 20, 1960

2,953,509

CATALYTIC CONVERSION OF PETROLEUM

Simon L. Ruskin, New York, N.Y., assignor to Union Carbide Corporation, New York, N.Y., a corporation of New York No Drawing. Filed July 28, 1955, Ser. No. 525,085

2 Claims. (Cl. 204—162)

My invention relates to the catalytic conversion of petroleum by simple and direct procedures free from expensive and elaborate chemical equipment presently necessary to secure optimum conditions for catalytic cracking and reforming of hydrocarbons. In the presently used art, catalytic metals such as platinum have been used particularly to effect hydrogenation but the efficiency of the platinum catalyst has been relatively low and many methods for improving platinum catalysis have been tried.

I have found that in order to secure the maximum effectiveness of platinum or other metal catalysis for the cracking or reforming (hydroforming) of petroleum, it is necessary to affect both the hydrocarbon and the metal catalyst. The hydrocarbon must be placed in a condition where it can furnish a carbonium ion and the reaction medium must be made favorable for the production of ions. To secure this favorable reaction medium, the metal catalyst must exhibit an appreciable electron conduction thus indicating that there are numerous free levels at various small distances from the occupied states. Some metallic oxides and sulphides are such electron conductors and I have found that they will absorb gamma radiation from a cobalt bomb. More particularly, I have found that the oxides of platinum, palladium, molybdenum, titanium, berylium, germanium, zerconium, silicon, aluminum, cadmium chromium, tin, cobalt, nickel, thorium, zinc and iron are effective while other metal oxides, sulphides or halides may also be employed. However, I have found that the most effective is platinum oxide while titanium oxide and molybdenum oxide are the next most effective.

When I irradiate with 100 million R. to 400 million R. a sample of reservoir oil in the presence of platinum oxide I am able to form carbonium ions characterized by very great reactivity. This is due to the fact that the carbonium ion produced by my irradiation with 100 million R. to 400 million R. in the presence of my metal catalyst carries only a sextet of electrons instead of a complete octet. They therefore react with great rapidity with other compounds in the petroleum mixture forming higher alkanes, alkenes, alkynes, aromatic olefins and naphthenes.

A typical reaction of this type is—

$$C_2H_5^\oplus \longrightarrow CH_2=CH_2+H^\oplus$$

giving the formation of an olefin with the expulsion of a proton that is again immediately reactive with the metal catalyst. Changes in configuration of carbonium compound readily occur and it is impossible to say for instance in which carbon atom the change resides. Thus the precise nature of the resulting compound cannot be stated but the stability of carbonium ions increase in the following order: primary, secondary, tertiary. Tertiary forms thus appear preferentially in the end products. Thus, in reactions where a neopentyl ion occurs, isomerization usually results.

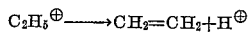

While these reactions occur readily in reservoir oil and petroleum fractions, similar reactions can be produced with carbon oxygen compounds of various types such as alcohols by my metal catalyzed irradiation with 100 million to 400 million R. Similarly, hydrolysis and transesterification of alkyl halides may be effected. Thus also alcohols can be converted to ethers and reversibly ethers to alcohols.

$$R^\oplus + HOR \longrightarrow R_2OH^\oplus \longrightarrow R_2O + H^\oplus$$

Thus the conversion of ethyl alcohol into diethyl ether can readily be demonstrated.

By my metal catalyzed irradiation with 100 million R. to 400 million R. I am also able to effect ring opening with ethylene oxide—

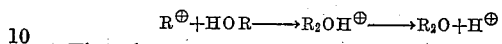

The carbonium ions produced by my metal catalyzed irradiation with 100 million R. to 400 million R. are particularly reactive with olefins leading to the various reactions of hydration, ester formation, polymerization and changes in configuration. These reactions hitherto required the interaction of strong acids like sulphuric acid.

Branched chain paraffins likewise react with olefins under my metal catalyzed irradiation with 100 million R. to 400 million R. Thus $$CH_3-CH=CH-CH_3+H^\oplus \longrightarrow CH_3-\underset{\oplus}{CH}-CH_2-CH_3$$

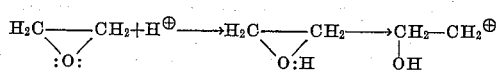

By extracting an atom of hydrogen from isobutane a new chain reaction is started or isomerization may occur.

Since the stability of carbonium ions increases in the series primary, secondary, tertiary, the secondary carbonium ion will have tendency to change over into one of the following:

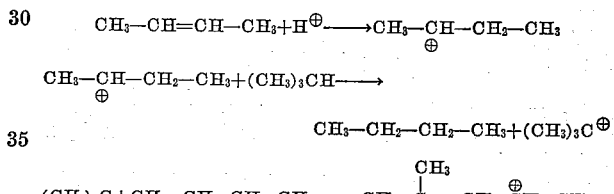

These new carbomium ions will either extract an atom of hydrogen from isobutane or react with a molecule of the olefin to produce compounds with twelve carbon atoms.

Simultaneous with this complexing reaction there simultaneously occurs a breakdown to smaller molecules occurring preferably at the β bond as follows:

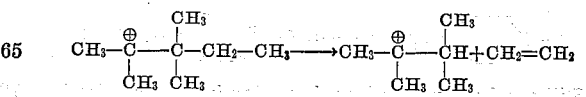

The olefin may again particpate in a reaction to build up a larger molecule.

I have found that while attack of compounds by acids through what appears to be an ionic mechanism leads primarily to alpha substitution. The reaction from my metal catalyzed irradiation with 100 million R. to 400 million R. favors beta substitution.

Thus, isomerization of n-butane under my metal catalyzed irradiation with 100 million R. to 400 million R. occurs as follows from $CyHg^{\oplus}$.

$$CH_3-CH_2-CH_2-\overset{*}{C}H_3$$

$$CH_3-CH_2-\overset{*}{C}H_2-CH_3$$

$$(CH_3)_2CH\overset{*}{C}H_3$$

$$(CH_3)_2\overset{*}{C}HCH_3$$

Isobutylene may be dimerized from the mixture of gases resulting from my metal catalyzed irradiation with 100 million R to 400 million R. The octylene produced is then converted during the irradiation to isooctane. Normal butylene will also condense with isobutylene to form a branched chain octane which is useful in improving antiknock properties.

Alkylation particularly is favored by my metal catalyzed irradiation with 100 million R. to 400 million R. The isoparaffins and olefins react very readily under the catalysis of the platinum oxide.

Hydroforming petroleum naphthas also proceeds readily with my metal catalyzed irradiation with 100 million R. to 400 million R. particularly when the metal catalyst is molybdenum oxide. Aromatization proceeds rapidly.

Another striking effect of my metal catalyzed irradiation with 100 million R. to 400 million R. is the inhibition of sediment formation and the inhibition of resin formation. The viscosity is usually lowered and free-flowing results.

Where reactions with aromatic compounds are conducted, I may catalyze my irradiation with 100 million R. to 400 million R. with metal halide catalysts particularly $AlCl_3$ or $AlBr_3$. This reaction likewise induces the displacement of a proton from the aromatic component by a carbonium ion.

Thus also the rate of reaction of various Friedel-Crafts type reactions are remarkably catalyzed when conducted under my conditions of metal catalyzed irradiation with 100 million R. to 400 million R. Thus—

$$C_6H_6 + CH_3COCl \rightarrow C_6H_5 \cdot CO \cdot CH_3 + HCl$$

While ordinarily when $AlCl_3$ is used as a catalyst the reaction does not go to completion unless more than one molecular equivalent of catalyst has been used, with my metal catalyzed irradiation with 100 million R. to 400 million R. the reaction goes promptly to completion.

It is thus apparent that carbonium ions will be able to enter the aromatic nucleus. Thus secondary and tertiary alcohols condense with benzene or naphthalene with the formation of alkyl derivatives under my metal catalyzed irradiation with 100 million to 400 million R. Thus also olefins and highly branched paraffins can react with benzene and trimethyl pentane gives ti-butyl-benzene and n-butane by my metal catalyzed irradiation with 100 million R. to 400 million R.

Thus also the synthesis of aromatic aldehydes from phenols and hydrocyanic acid is induced by my metal catalyzed irradiation with 100 million R. to 400 million R. The reaction may be written as follows:

$$HC \equiv N + H^{\oplus} \longrightarrow HC^{\oplus} = NH$$

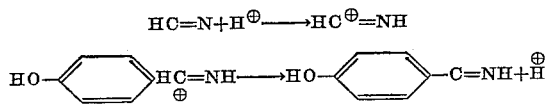

Still another aspect of my invention is the diazotization and the reactions of diazonium compounds induced by my metal catalyzed irradiation with 100 million R. to 400 million R. The diazonium ion $C_6H_5N_2^{\oplus}$ is formed by the action of nitrous acid on aromatic amines. Under my metal catalyzed irradiation rapid decomposition occurs with the liberation of $N_2$ and the formation of a carbonium ion that is very reactive. Thus phenol may then be formed by boiling in water.

$$C_6H_5^{\oplus} + OH^{\ominus} \longrightarrow C_6H_5-OH$$

Thus also diazonium compounds produced by my metal catalyzed irradiation with 100 million R. to 400 million R. react with phenols and amines without loss of nitrogen with the formation of diazo compounds.

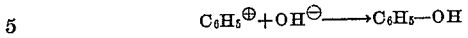

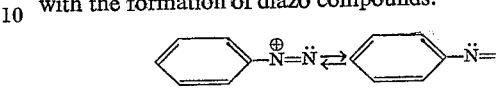

While the above described reactions are well known to occur under standard conditions of chemical reactions as described in the literature, I have found that by my metal catalyzed irradiation with 100 million R. to 400 million R. the carbonium ion is produced under simple and direct reaction with a minimum of equipment and without the use of corrosive acids and other reagents. Thus, particularly in the reactions between petroleum and my metal catalyzed irradiation with 100 million R. to 400 million R. I produce in a most economical manner products of great commercial value.

Another aspect of my invention is the simultaneous irradiation with 100 million R. to 400 million R. of petroleum with the addition of 2 percent to 5 percent of glycol such as glycerine and a metal oxide catalyst such as platinum oxide. The addition of the glycol increases the reactivity of the platinum oxide leading particularly to high aromatic compound formation with high octane number.

*Example I*

To 200 cc. natural crude petroleum oil was added 20 mg. platinum oxide and the whole was irradiated with 100 million R. from a cobalt 60 source. The black natural oil became fluorescent green. Analysis showed distillation test as follows:

| Initial Boiling Point | 20% | 40% | 50% | 60% | 80% | End Point | Specific Gravity at 60° F. | Viscosity at 77° F., Centistokes |
|---|---|---|---|---|---|---|---|---|
| °F. 210 | °F. 295 | °F. 482 | °F. 496 | °F. 560 | °F. 620 | °F. 620 | .8591 | 10.3 |

To 200 cc. natural crude petroleum oil was added 200 mg. platinum oxide and 10 cc. glycerine. The whole was irradiated with 100 million R. There was a deep fluorescent color produced and a marked odor of aromatic compounds.

*Example II*

To 200 cc. natural crude petroleum oil was added 20 cc. of palladium chloride and the whole was irradiated with 100 million R. from a cobalt 60 source. The black natural oil became a fluorescent forest green.

Analysis showed:

| Initial Boiling Point | 20% | 40% | 50% | 60% | 80% | End Point | Specific Gravity at 60° F. | Viscosity at 77° F., Centistokes |
|---|---|---|---|---|---|---|---|---|
| °F. 190 | °F. 250 | °F. 420 | °F. 520 | °F. 550 | °F. 660 | °F. 670 | .8555 | 8.04 |

*Example III*

To 200 cc. natural crude petroleum oil was added 40 mg. molybdenum sesquioxide. The whole was irradiated to 100 million R. The black oil changed to a light green fluorescent liquid. Analysis showed:

| Initial Boiling Point | 20% | 40% | 50% | 60% | 80% | End Point | Specific Gravity at 60° F. | Viscosity at 77° F., Centistokes |
|---|---|---|---|---|---|---|---|---|
| °F. 180 | °F. 254 | °F. 430 | °F. 508 | °F. 585 | °F. 640 | °F. 660 | .8576 | 8.04 |

*Example IV*

To 200 cc. natural crude petroleum oil was added 20 mg. nickel powder. The black oil remained blackish green with increased fluorescence. Analysis showed:

| Initial Boiling Point | 20% | 40% | 50% | 60% | 80% | End Point | Specific Gravity at 60° F. | Viscosity at 77° F., Centistokes |
|---|---|---|---|---|---|---|---|---|
| °F. 180 | °F. 355 | °F. 525 | °F. 610 | °F. 610 | °F. 635 | °F. 655 | .8555 | 15.5 |

*Example V*

200 cc. natural crude petroleum oil was irradiated with 100 million R. The black oil changed to a light greenish fluorescent color. Analysis showed:

| Initial Boiling Point | 20% | 40% | 50% | 60% | 80% | End Point | Specific Gravity at 60° F. | Viscosity at 77° F., Centistokes |
|---|---|---|---|---|---|---|---|---|
| °F. 210 | °F. 340 | °F. 535 | °F. 610 | °F. 640 | °F. 680 | °F. 680 | .8555 | 16.7 |

*Example VI*

To 200 cc. natural crude petroleum oil was added 20 mg. vanadium pentoxide. The whole was irradiated with 100 million R. The color became dark greenish and fluorescent. Analysis showed:

| Initial Boiling Point | 20% | 40% | 50% | 60% | 80% | End Point | Specific Gravity at 60° F. | Viscosity at 77° F., Centistokes |
|---|---|---|---|---|---|---|---|---|
| °F. 210 | °F. 340 | °F. 530 | °F. 584 | °F. 584 | °F. 590 | °F. 590 | .8686 | 18.4 |

*Example VII*

To 200 cc. natural crude petroleum oil was added 50 mg. lead oxide. The whole was irradiated with 100 million R. The color became deep dark greenish fluorescent. Analysis showed:

| Initial Boiling Point | 20% | 40% | 50% | 60% | 80% | End Point | Specific Gravity at 60° F. | Viscosity at 77° F., Centistokes |
|---|---|---|---|---|---|---|---|---|
| °F. 180 | °F. 320 | °F. 530 | °F. 605 | °F. 640 | °F. 650 | °F. 655 | .8702 | 17.8 |

*Example VIII*

To 200 cc. bunker oil #6 kept fluid by heating was added 20 mg. platinum oxide. The whole was irradiated with 100 million R. Before irradiation the bunker oil of thick black pitchy material with a viscosity of between 200 and 300 and boiling range of 600° F. to 650° F. After irradiation with 100 million R. the whole became amber colored, flowed freely and showed no tendency to harden. Analysis showed:

| Initial Boiling Point | 20% | 40% | 50% | 60% | 80% | End Point | Specific Gravity at 60° F. | Viscosity at 77° F. Centistokes |
|---|---|---|---|---|---|---|---|---|
| °F. 320 | °F. 395 | °F. 480 | °F. 495 | °F. 498 | °F. 513 | °F. 515–615 | 8.5 | 6 |

The bunker oil experiment showed the most striking results because the starting material was so very different in appearance from that after the catalytic irradiation. It is remarkable that the irradiation of bunker oil #2, 4, or 6 with 100 million to 400 million R. without any metallic catalyst cracks promptly to an amber colored free flowing fluid, viscosity 4.5. However with the platinum oxide catalyst there is apparently some hydro reforming with a viscosity of 6. In the case of bunker oil where the lowest viscosity is desired, the irradiation with 100 million R. to 400 million R. is sufficient in itself to catalytically crack either bunker oil 2, 4, or 6 very readily.

What I claim is:

1. A process for treating petroleum which comprises gamma irradiating the petroleum with about 100 million roentgens from a cobalt 60 bomb in the presence of a catalyst selected from the group consisting of platinum oxide, palladium chloride, vanadium pentoxide and lead oxide, whereby both the viscosity and boiling range of said petroleum are lowered.

2. A process for treating petroleum which comprises gamma irradiating the petroleum with about 100 million roentgens from a cobalt 60 bomb in the presence of a catalyst selected from the group consisting of platinum oxide, palladium chloride, vanadium pentoxide and lead oxide, thereby altering the composition of said petroleum so as to lower both the viscosity and boiling range of said petroleum, and separating the product obtained from said treating.

References Cited in the file of this patent

UNITED STATES PATENTS

| | | |
|---|---|---|
| 1,627,938 | Tingley | May 10, 1927 |
| 1,961,493 | Hillis | June 5, 1934 |
| 2,350,330 | Remy | June 6, 1944 |
| 2,743,223 | McClinton et al. | Apr. 24, 1956 |

OTHER REFERENCES

Berkman et al.: "Catalysis," Reinhold Publishing Corp., New York (1940), pp. 725–727.